United States Patent [19]

Snowball

[11] Patent Number: 4,757,921

[45] Date of Patent: Jul. 19, 1988

[54] WATER DISPENSERS AND METHODS

[75] Inventor: Malcolm R. Snowball, East Sussex, Great Britain

[73] Assignee: Wm Still & Sons Limited, England

[21] Appl. No.: 119,209

[22] Filed: Nov. 5, 1987

Related U.S. Application Data

[63] Continuation of Ser. No. 865,172, May 20, 1986, abandoned.

[30] Foreign Application Priority Data

May 24, 1985 [GB] United Kingdom ............... 8513172

[51] Int. Cl.⁴ .................... B67D 5/62; B67D 5/58; C02F 1/32; A61L 2/10
[52] U.S. Cl. ................... 222/146.6; 222/190; 210/259; 250/436; 422/24
[58] Field of Search .............. 222/146.6, 148, 190, 222/478, 146.1; 422/23, 24; 210/259; 250/436, 437, 432 R, 434, 435

[56] References Cited

U.S. PATENT DOCUMENTS

| | | |
|---|---|---|
| 1,051,350 | 1/1913 | Nogier ................... 422/24 |
| 1,190,609 | 7/1916 | Von Recklinghausen ......... 250/433 |
| 1,190,769 | 7/1916 | Jurist . |
| 1,191,304 | 7/1916 | Helbronner . |
| 1,200,940 | 10/1916 | Henri et al. ............... 250/48 |
| 1,218,147 | 3/1917 | Wilson . |
| 1,266,803 | 5/1918 | Henri et al. . |
| 1,278,278 | 9/1918 | Wood . |
| 1,473,095 | 11/1923 | Henri et al. . |
| 1,486,473 | 3/1924 | Ailhaud . |
| 1,842,313 | 1/1932 | Chaney . |
| 1,898,365 | 2/1933 | Harding . |
| 1,969,655 | 8/1934 | Mailey . |
| 2,038,795 | 4/1936 | Klocke . |
| 2,338,388 | 1/1944 | Whitman ................... 422/24 |
| 2,470,806 | 5/1949 | Del Cueto . |
| 2,501,290 | 3/1950 | Pequignot . |
| 2,537,774 | 1/1951 | Machinist ................ 250/436 |
| 2,669,661 | 2/1954 | Riddiford et al. . |
| 3,079,498 | 2/1963 | Ruffin . |
| 3,309,159 | 3/1967 | Le Sueur et al. . |
| 3,550,782 | 12/1970 | Veloz ................... 422/24 X |
| 3,589,862 | 6/1971 | Veloz ................... 250/432 X |
| 3,843,521 | 10/1974 | Zeff . |
| 3,856,676 | 12/1974 | Grimme, Jr. et al. ......... 210/259 X |
| 3,906,236 | 9/1975 | Callahan ................ 250/455 |
| 3,923,663 | 12/1975 | Reid .................... 210/251 |
| 3,971,947 | 7/1976 | Lambert et al. ........... 250/437 |
| 4,101,777 | 7/1978 | Reid ................... 250/432 R X |
| 4,156,652 | 5/1979 | Wiest .................. 250/527 |
| 4,171,069 | 10/1979 | Cornelius et al. ......... 222/146.6 X |
| 4,179,616 | 12/1979 | Coviello et al. .......... 250/527 |
| 4,273,660 | 6/1981 | Beitzel ................. 210/760 |
| 4,276,256 | 6/1981 | Karamian ............... 422/24 |
| 4,296,328 | 10/1981 | Regan .................. 250/436 |
| 4,322,291 | 3/1982 | Ho ..................... 210/181 |
| 4,400,270 | 8/1983 | Hillman ................ 210/103 |
| 4,597,509 | 7/1986 | Pereira ................ 222/146.6 X |
| 4,615,799 | 10/1986 | Mortensen .............. 422/24 X |

FOREIGN PATENT DOCUMENTS

| | | | |
|---|---|---|---|
| 2327084 | 12/1974 | Fed. Rep. of Germany ........ 422/24 |
| 904380 | 8/1962 | United Kingdom ............ 222/144.6 |
| 2022979 | 12/1979 | United Kingdom . |
| 2038795 | 7/1980 | United Kingdom . |
| 2161467 | 1/1986 | United Kingdom . |

*Primary Examiner*—Joseph J. Rolla
*Assistant Examiner*—Nils E. Pedersen
*Attorney, Agent, or Firm*—Wood, Herron & Evans

[57] ABSTRACT

Water dispensing apparatus which is intended to dispense sterilized chilled water comprising a sterilization unit having an inlet for connection to mains water supply and having its outlet connected to a refrigeration unit, the refrigeration unit having a tap or dispensing valve. Preferably, the sterilizing unit comprises an ultra violet lamp surrounded by an outer tube and through which water flows between inlet and outlet. If desired a water reservoir may be connected to the sterilizer, the arrangement being such that water is sterilized both on entering the reservoir and on leaving the reservoir and so that make-up air is sterilized on entering the reservoir.

20 Claims, 3 Drawing Sheets

WATER DISPENSERS AND METHODS

This application is a continuation, of application No. 865172, filed May 20, 1986 abondoned.

This invention relates to liquid dispensers.

Dispensers for sterilised chilled water have hitherto had to be provided with a cylinder, bottle or the like of sterilised water which is then chilled for drinking. This has meant that when the cylinder or bottle has beem emptied, a fresh full cylinder of sterilised water has had to be provided.

Alternatively, in the case of plumbed-in units, the mains water has been introduced through some sort of activated carbon filter, which cleans the water but does not produce microbe free water.

It is therefore a general object of this invention to provide a chilled sterilised liquid dispenser which can automatically be supplied with water (plumbed-in).

This object is basically achieved in accordance with the invention by apparatus comprising a water sterilising unit for connection at its inlet, to a source of water or other liquid and being connected at its outlet to a refrigerator unit, the refrigerator unit being in turn connected to a tap or dispensing valve.

The water sterilising unit is preferably a germicidal ultra violet ray water steriliser which may, for example, comprise an inner germicidal ultra violet lamp surrounded by an outer tube through which water flows. A preferred form is that forming the subject of our co-pending British Application No. 8,513,172.

In one preferable arrangement, water from a mains supply flows through a portion of the water sterilising unit and is then open to a water reservoir, e.g., an inverted bottle, water from the reservoir being dispensed preferably through a second portion of the sterilising unit. Either the reservoir may be chilled or the refrigeration unit is connected between the reservoir and dispensing tap.

With such an arrangement, water is sterilised both on entering and on leaving the reservoir.

As water is dispensed from the container and before a pre-determined low water level is reached, make-up air has to flow into the container to take the place of the water being dispensed. In order to avoid contamination of the water in the container, make-up air is preferably introduced through a path which runs closely adjacent to the germicidal ultra violet lamp so that only sterile make-up air contacts, the sterilised water remaining in the container/reservoir. The air may be drawn from the air space between the germicidal ultra violet lamp and the quartz glass sleeve (lamp cavity). In this way, the risk of contamination of sterilised water stored in the reservoir, possibly for some time, is very much reduced.

If desired, a hot water reservoir may also be connected to the apparatus which may then supply either chilled and/or heated water.

In an alternative embodiment, an ultra violet ray tube constituting a water sterilising unit may be inserted in the entrance passage for the water reservoir. Water flowing into the reservoir through the passage around the tube is then sterilised as is water flowing out from the reservoir. Make-up air can then be introduced into the inlet/outlet passage close to the ultra violet tube. If the reservoir has the form of an inverted bottle, the entrance passage may be constituted by the open neck of the bottle (possibly elongated) and the ultra violet tube will extend up through the neck. Air then passed into the bottle will bubble up through the water already in the bottle and around the ultra violet tube in the neck.

The invention will now be further described by way of example with reference to the schematic drawings in which.

Figure 1:
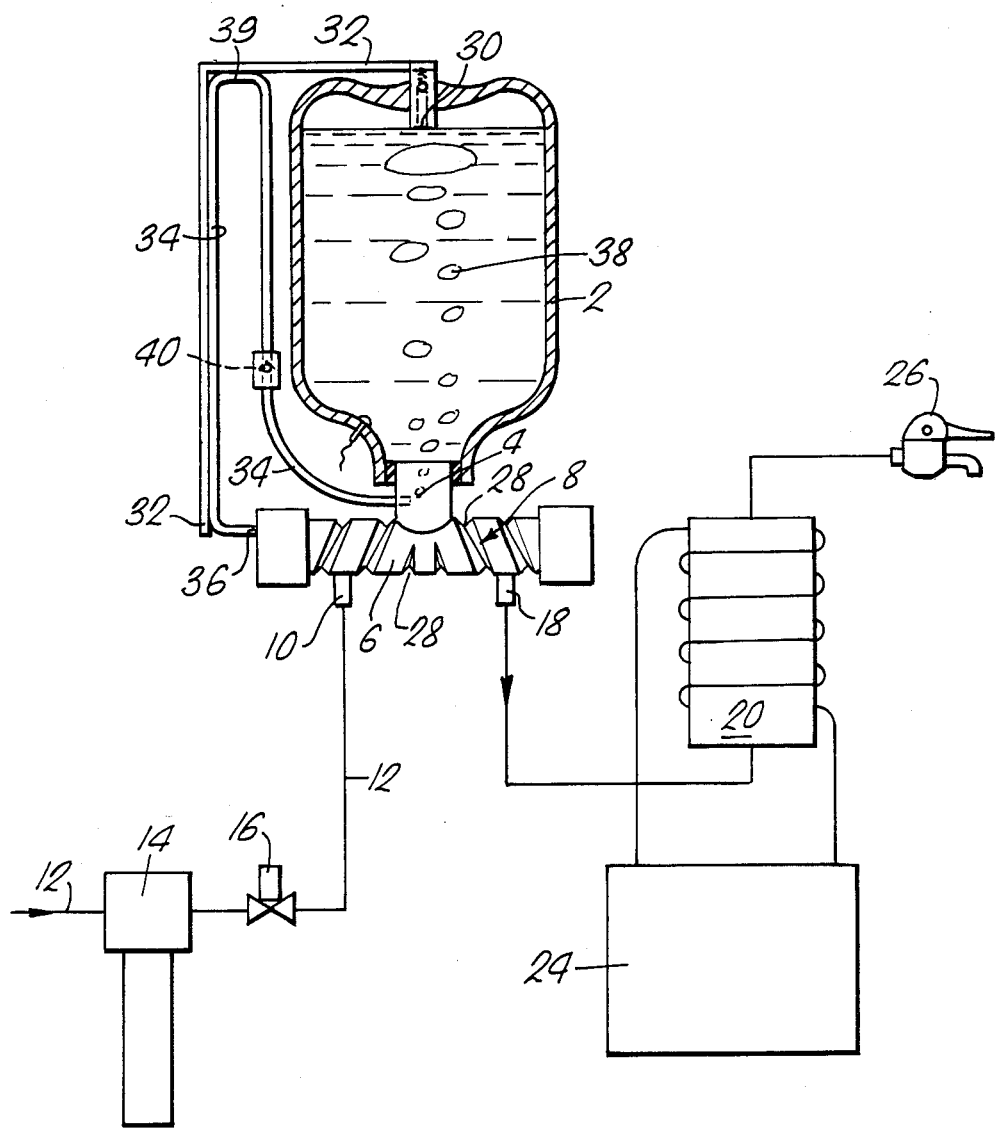
FIG. 1 shows an automatic chilled pure water dispenser.

Referring to FIG. 1, the liquid dispenser comprises a water reservoir generally indicated at 2 in the form of an inverted bottle, the neck 4 of which is connected through an outer casing 6 of a water sterilising unit generally indicated at 8 at about the centre point of the water flow path through the unit.

The inlet 10 of the water sterilising unit is connected by a pipe 12 to a mains water supply through an activated carbon filter 14 and a solenoid valve 16.

The outer 18 of the sterilising unit 8 is connected to a chilled water chamber 20 surrounded by evaporator coils 22 of a standard refrigeration unit or a standard twin coil liquid evaporator unit indicated at 24. The water chamber 20 is provided with a tap or valve 26.

The sterilising unit 8 contains an ultra violet ray tube (not shown) surrounded by a quartz tube. The quartz tube is itself surrounded by the outer casing 6 and water flows between the inlet 10 and outlet 18 along the passage between the outer casing 6 and the quartz tube surrounding the ultra violet tube and in close proximity to that ultra violet tube. The outer casing 6 is provided with a helical groove 28 as is fully described in our copending application No. 8,513,172 so as to ensure that all portions of the water are brought into close proximity with the quartz tube during the flow of water through the steriliser. A small gap is left between the bottom of the helical groove and the outer surface of the quartz tube.

When the water reservoir 2 is to be filled the valve 16 is opened and water flows from the inlet pipe 12 and through the filter 14 preferably of the activated carbon type which acts to remove particulate matter, unpleasant odours and taste from the water. The water then passes into the portion of the sterilising unit between the inlet 10 and the neck 4 of the inverted water bottle reservoir 2. This water which is under pressure is sterilised during its passage through the first half of the steriliser in close proximity to the ultra violet tube. The sterilised water then flows into the bottle 2 as and until the level reaches an upper probe 30 when the solenoid valve 16 receives an electrical signal from the probe 30 acting to close the valve. Air already in the bottle 2 exits via a non-return valve present in the probe unit 30, through a passage 32, to atmosphere.

If, as the reservoir is filling, chilled water is drawn off by opening tap 26, the unit is designed so that the capacity of the sterilizer will adequately perform its sterilization function in this event as water is made to flow from input 10 to output 18 (bypassing the reservoir) and into the water chamber 20.

When chilled purified water is to be dispensed, the tap 26 is opened and chilled purified water which has been held in the chamber 20 flows from the tap. The water in the chamber 20 is replaced from the water flowing from the bottle 2 through the second part of the ultra violet steriliser, to the outlet 18. It will thus be seen that water is sterlised during its passage both into and out from the bottle reservoir 2.

As water flows out from the reservoir, make-up air flows into the neck 4 of the bottle through a tube 34 connected at 36 to the space between the outer casing 6 and the inner quartz tube of the water steriliser (lamp cavity). Thus this air is itself sterilised due to its close proximity to the ultra violet tube. The sterilised air bubbles up, as indicated at 38, through the water in the reservoir and into the head space. A non-return valve 40 is provided to allow air to flow into the bottle but to prevent water flowing out through the tube 34. As an added precaution to prevent water flowing into tube 34 its highest point 39 is above the high water level of the reservoir 2.

When the level of water in the bottle drops to a predetermined level, a low level water probe 42 is exposed to transmit a signal to open the solenoid valve 16 to allow the bottle again to be filled.

In this way, chilled purified water can constantly be dispensed with the air in contact with the water in the reservoir itself being purified as is the water as it flows into and out from, the reservoir.

Figure 2:
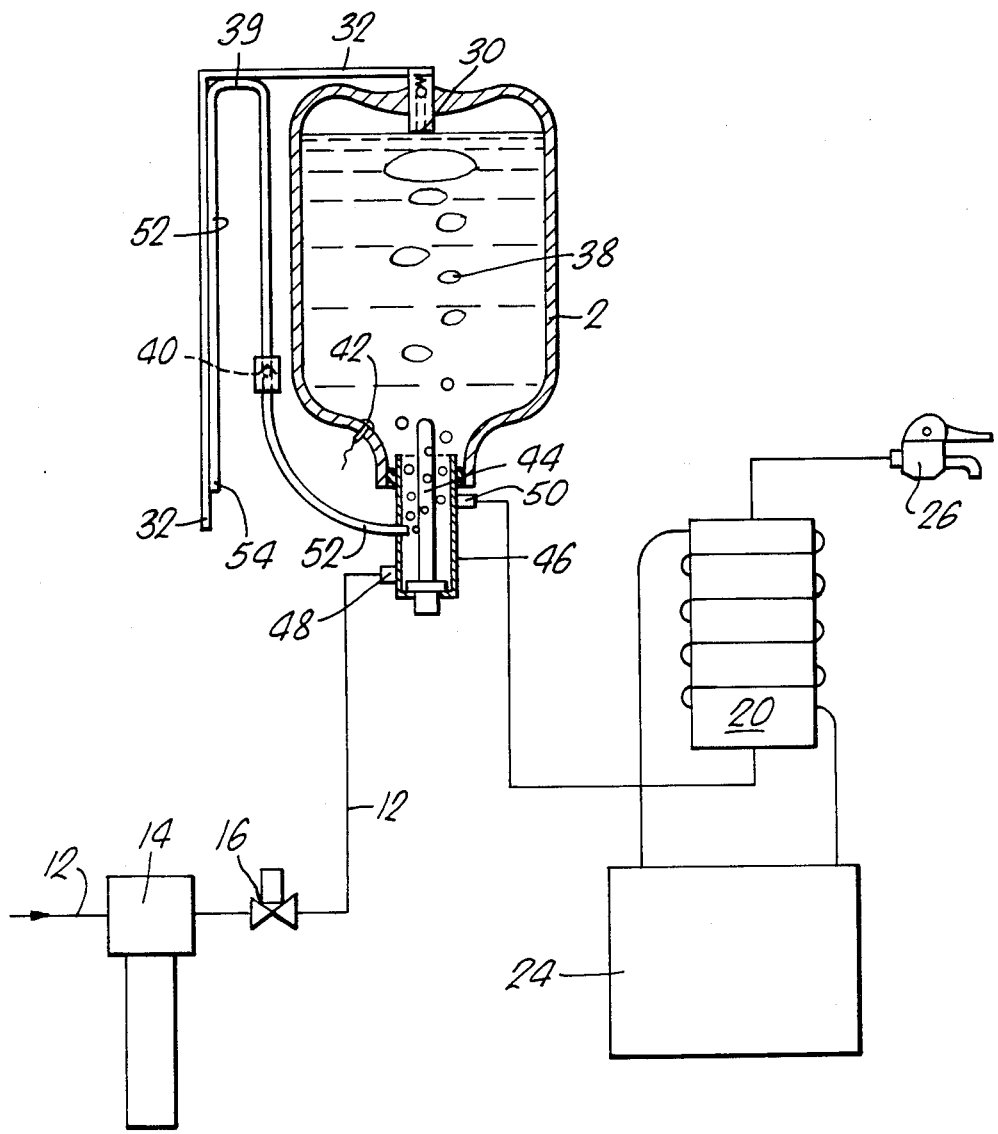
FIG. 2 is a view similar to FIG. 1 but showing an alternative sterilising unit arrangement.

The arrangement illustrated in FIG. 2 differs from that illustrated in FIG. 1 in that the water purifing unit comprises a single ended ultra violet ray tube 44 with intergral outside quartz double skin and vacuum space which is inserted into an elongated neck 46 of the inverted bottle 2. The inlet 48 for mains water is adjacent the lower end of the elongated neck 46 so that incoming water has to flow up the neck between the wall thereof and the ultra violet tube 44 into the bottle. It is thus sterilised as it flows up the neck.

Water flowing from the reservoir to the chilled water chamber 20 flows through an outlet 50 in the elongated neck so again water flowing from the reservoir passes adjacent the ultra violet tube 44.

Make-up air flows through a tube 52 which is connected into the elongated neck 46 and has its outer end 54 open to atmosphere. The air is purified during its passage up the neck into the reservoir during which time it passes closely adjacent to the ultra violet tube 44. Thus again it will be seen that water is sterilised both when flowing into and out from the water reservoir and air is purified as it enters the reservoir.

Figure 3:
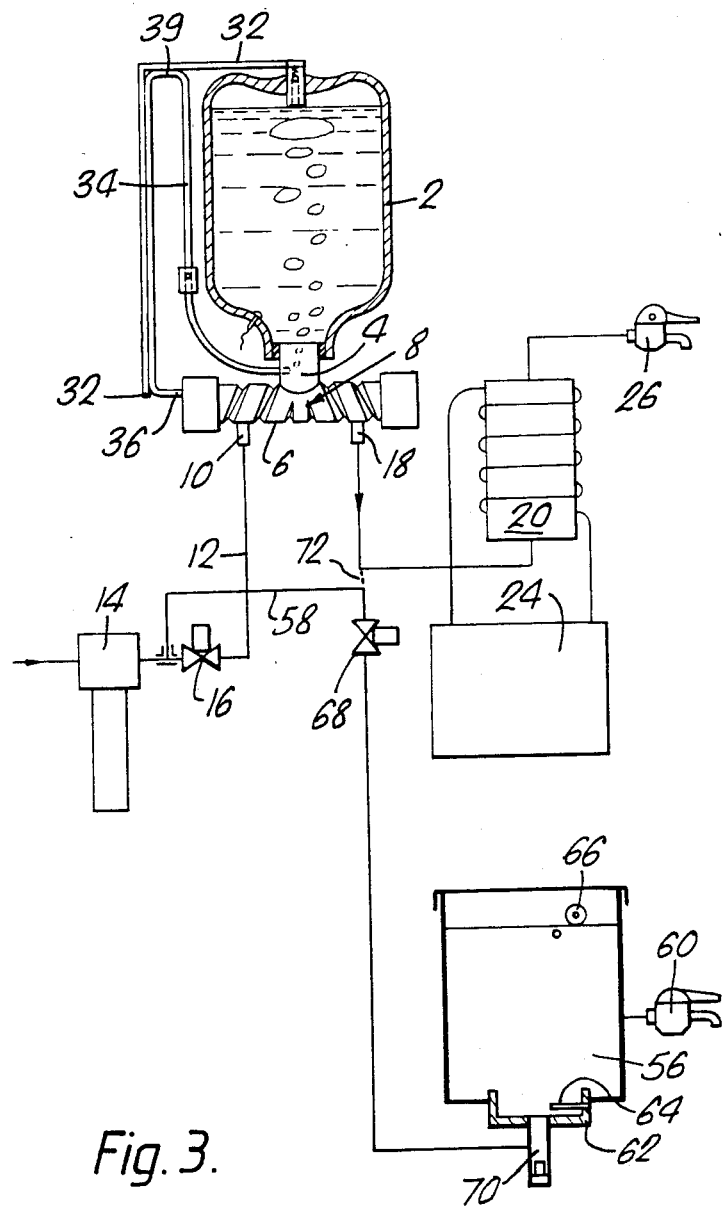
FIG. 3 is a view of apparatus similar to that shown in FIG. 1 but adapted also to dispense hot water.

In the construction shown in FIG. 3, a hot water reservoir 56 is connected through pipe 58 to the water supply pipe 12 between the solenoid valve 16 and the filter 14. The reservoir 56 is provided with a dispensing tap 60 and contains a water heater 62 controlled by a thermostat 64. High and low water level probes 66 are provided and when the lower water level probes us exposed, a signal is transmitted to open the solenoid valve 68 to allow water to flow into the inlet 70 of the reservoir. This water is not sterilised but if sterilised water is required then this can be obtained from the outlet pipe 18 of the water sterilising unit 8 by connecting the solenoid valve 68 to outlet 18 (link 72) and dispensing with passage 58. The signal from the water level probe opens solenoid 68 water flowing from reservoir 2 into the inlet 70 of the water heater 70.

What we claim is:

1. Water dispensing apparatus for storing and dispensing sterilized water comprising
    a water reservoir having a common inlet and outlet,
    a sterilizer unit fitted at the common inlet and outlet for sterilizing water before it flows into said water reservoir via the common inlet and for resterilizing the water after it flows out of said water reservoir via the common outlet, said sterilizer unit having an inlet receiving water from a main water supply and an outlet dispensing the resterilized water.

2. Water dispensing apparatus as claimed in claim 1, said sterilizing unit comprising
    a germicidal ultra violet ray sterilizer having an inner germicidal ultra violet ray lamp surrounded by an outer tube through which water flows between said unit's inlet and outlet.

3. Water dispensing apparatus as claimed in claim 2, said reservoir comprising
    an inverted bottle.

4. Water dispensing apparatus as claimed in claim 3, said apparatus comprising
    a make up air tube that connects said water reservoir to atmosphere along a path which runs closely adjacent to said ultra-violet lamp of said water sterilising unit so that only sterilized make-up air contacts sterilized water in said reservoir.

5. Water dispensing apparatus as claimed in claim 1, said water sterilizing unit comprising
    an ultra-violet ray tube located in said common inlet and outlet of said water reservoir, water flowing into said reservoir through a passage around said tube being sterilized both on entry into said reservoir and on exit from said reservior.

6. Water dispensing apparatus as claimed in claim 5, said reservoir comprising
    an inverted bottle where said common inlet and outlet is constituted by the open neck of said bottle, said ultra-violet ray tube extending up into said bottle's neck.

7. Water dispensing apparatus as claimed in claim 5, said water reservoir comprising
    an inverted bottle where said common inlet and outlet is the open neck of said bottle, said ultra-violet ray tube extending up into the bottle's neck.

8. Water dispensing apparatus of claim 1, said apparatus further comprises
    a main water supply connected to the inlet of said sterilizer unit.

9. Water dispensing apparatus of claim 1, said apparatus further comprises
    a dispensing valve connected to the outlet of said sterilizer unit for controlling outflow of the resterilized water therefrom as desired by a user of said apparatus.

10. Water dispensing apparatus of claim 1, said apparatus further comprises
    a refrigeration unit connected to said water reservoir for chilling the water.

11. Water dispensing apparatus of claim 10, said refrigeration unit being connected to the outlet of said sterilizer unit for chilling the resterilizer water dispensed from said water reservoir.

12. Water dispensing apparatus of claim 1, said apparatus further comprises a refrigeration unit connected to the outlet of said sterilizer unit, and
    a dispensing valve connected to said refrigeration unit for controlling outflow of resterilized and chilled water therefrom as desired by a user of said apparatus.

13. Water dispensing apparatus of claim 1, said sterilizer unit is an ultra-violet sterilizer unit.

14. Water dispensing apparatus of claim 1, said apparatus further comprises filtering means connected to said water reservoir for removing particular matter and unpleasant odors and taste from the water.

15. Water dispensing apparatus of claim 14, said filtering means is adapted to be connected between a main water supply and the inlet of said sterilizer unit for removing particulate matter and unpleasant odors and taste from the water before it flows into said sterilizer unit via the inlet of said sterilizer unit.

16. Water dispensing apparatus for storing and dispensing sterilized water comprising
a water reservoir having a common inlet and outlet,
an ultra-violet sterilizer unit connected to the common inlet and outlet for sterilizing the water before it flows into said water reservoir via the common inlet and for resterilizing the water after it flows out of said water reservoir via the common outlet, said ultra-violet sterilizer unit having an inlet for receiving water from a main water supply and an outlet for dispensing the resterilized water.

17. Water dispensing apparatus comprising
a water reservoir having a common inlet and outlet,
a sterilizer unit fitted to said common inlet and outlet, said sterilizer unit comprising an ultra-violet ray tube having an inlet and an outlet, water flowing into and out of said water reservoir through a passage around the tube being sterilized both on entry into said water reservoir and on exit from said water reservoir, a main water supply connected to said sterilizer unit inlet,
a refrigeration unit connected to said sterilizer unit outlet, and
a dispensing valve connected to said refrigeration unit for controlling outflow of sterilized and chilled water therefrom as desired by a user of said apparatus.

18. A method of supplying sterilized water comprising the steps of
directing water through a sterilizer unit connected to a common inlet and outlet of a water reservoir for sterilizing the water before it enters into the water reservoir via the common inlet,
directing the sterilized water out of the water reservoir via the common outlet and through the sterilizer unit for resterilizing the sterilized water, and
directing the resterilized water to a dispenser for supplying the sterilized water.

19. A method of claim 14 including the further step of directing the resterilized water through a refrigeration unit for chilling the resterilized water before the resterilized water is directed to the dispenser.

20. A method of claim 14 including the further step of directing the water from a main water supply through a filter for removing particulate matter and unpleasant odors and taste from the water before the water is directed through the sterilizer unit.

* * * * *

UNITED STATES PATENT AND TRADEMARK OFFICE
CERTIFICATE OF CORRECTION

PATENT NO. : 4,757,921

DATED : July 19, 1988

INVENTOR(S) : Malcolm R. Snowball

It is certified that error appears in the above-identified patent and that said Letters Patent is hereby corrected as shown below:

Column 2, line 22 "outer" should be --outlet--

Column 3, line 52 delete "probes us" and insert

-- probe is --

Signed and Sealed this

Fifteenth Day of August, 1989

Attest:

DONALD J. QUIGG

Attesting Officer

Commissioner of Patents and Trademarks